(12) United States Patent
Taguchi et al.

(10) Patent No.: US 9,701,828 B2
(45) Date of Patent: Jul. 11, 2017

(54) FLUORINATED ELASTOMER COMPOSITION AND METHOD FOR ITS PRODUCTION, MOLDED PRODUCT, CROSS-LINKED PRODUCT, AND COVERED ELECTRIC WIRE

(71) Applicant: Asahi Glass Company, Limited, Chiyoda-ku (JP)

(72) Inventors: Daisuke Taguchi, Chiyoda-ku (JP); Satoko Yasuda, Chiyoda-ku (JP); Takashi Sato, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 0 days.

(21) Appl. No.: 15/070,098

(22) Filed: Mar. 15, 2016

(65) Prior Publication Data

US 2016/0194491 A1    Jul. 7, 2016

Related U.S. Application Data

(63) Continuation of application No. PCT/JP2014/075140, filed on Sep. 22, 2014.

(30) Foreign Application Priority Data

Sep. 25, 2013   (JP) ................. 2013-198250

(51) Int. Cl.
| | |
|---|---|
| *C08L 27/20* | (2006.01) |
| *C08J 3/20* | (2006.01) |
| *C08L 27/18* | (2006.01) |
| *C08L 63/00* | (2006.01) |
| *H01B 3/28* | (2006.01) |
| *H01B 3/44* | (2006.01) |
| *C09D 127/12* | (2006.01) |
| *C09D 127/18* | (2006.01) |
| *C08L 27/12* | (2006.01) |

(52) U.S. Cl.
CPC ............ *C08L 27/20* (2013.01); *C08J 3/20* (2013.01); *C08L 27/12* (2013.01); *C08L 27/18* (2013.01); *C08L 63/00* (2013.01); *C09D 127/12* (2013.01); *C09D 127/18* (2013.01); *H01B 3/28* (2013.01); *H01B 3/44* (2013.01); *H01B 3/441* (2013.01); *C08J 2327/18* (2013.01); *C08L 2205/02* (2013.01)

(58) Field of Classification Search
CPC .......... H01B 3/28; H01B 3/441; H01B 3/445; H01B 7/295; H01B 7/041; H01B 7/0045; B60R 16/0215; C08L 27/18; C08L 23/0884; C08L 2205/025; C08L 2205/03; C08K 3/22

See application file for complete search history.

(56) References Cited

U.S. PATENT DOCUMENTS 7,019,079 B2 *  3/2006  Sumi et al. ............. C08L 27/18
                                                        525/199

FOREIGN PATENT DOCUMENTS

| JP | 5-78539 | 3/1993 |
|---|---|---|
| JP | 6-248146 | 9/1994 |
| JP | 8-153416 | 6/1996 |
| JP | 10-334738 | 12/1998 |
| JP | 2010-186585 | 8/2010 |
| JP | 2013-170259 | 9/2013 |
| WO | WO 2013/146704 A1 | 10/2013 |

OTHER PUBLICATIONS

English Translation of International Search Report issued Nov. 11, 2014 in PCT/JP2014/075140, filed Sep. 22, 2014.

* cited by examiner

*Primary Examiner* — Nathan M Nutter
(74) *Attorney, Agent, or Firm* — Oblon, McClelland, Maier & Neustadt, L.L.P.

(57) ABSTRACT

To provide a fluorinated elastomer composition which is excellent in heat discoloration resistance and moldability, and a molded product, cross-linked product and covered electric wire, using such a fluorinated elastomer composition.

A fluorinated elastomer composition comprising a fluorinated rubber (a) and a fluorinated copolymer (b), wherein the fluorinated copolymer (b) has units (A) derived from tetrafluoroethylene and units (B) derived from ethylene in a molar ratio [(A)/(B)] of the units (A) to the units (B) of from 25/75 to 80/20; the fluorinated copolymer (b) has a crystallization temperature of from 100 to 210° C. and a melt flow rate of from 0.1 to 1,000 g/10 min.; and the mass ratio [(a)/(b)] of the fluorinated rubber (a) to the fluorinated copolymer (b) is from 80/20 to 20/80.

12 Claims, 2 Drawing Sheets

FLUORINATED ELASTOMER COMPOSITION AND METHOD FOR ITS PRODUCTION, MOLDED PRODUCT, CROSS-LINKED PRODUCT, AND COVERED ELECTRIC WIRE

TECHNICAL FIELD

The present invention relates to a fluorinated elastomer composition and a method for its production, a molded product, a cross-linked product, and a covered electric wire.

BACKGROUND ART

A tetrafluoroethylene/propylene copolymer (hereinafter sometimes referred to as a "TFE/P copolymer") is used for hoses, tubes, gaskets, packing, diaphragms, sheets, electric wire covering materials, etc., as an elastomer material which is excellent in properties such as heat resistance, oil resistance, chemical resistance, electrical insulation properties, flexibility, etc. and which is radiation cross-linkable.

Further, in order to supplement the properties of a TFE/P copolymer, it has been proposed to blend an ethylene/tetrafluoroethylene copolymer (hereinafter sometimes referred to as "ETFE") to the TFE/P copolymer.

For example, in Patent Document 1, it is attempted to improve mechanical properties such as tensile strength and tear strength, or properties such as toughness, etc. by blending ETFE to a TFE/P copolymer. And, in Patent Document 1, for the purpose of lowering the compound price, a large amount of an ethylene/acrylate copolymer or an ethylene/vinyl acetate copolymer is further blended in addition to the TFE/P copolymer and ETFE.

In Patent Document 2, in order to improve the cut-through resistance (properties less susceptible to thermal softening at high temperatures) of a TFE/P copolymer, ETFE is blended together with calcium carbonate.

Also in Patent Document 3, in order to improve the cut-through resistance, ETFE is blended. Patent Document 3 discloses that if the ETFE to be blended to a TFE/P copolymer is too much, the flexibility and elongation tend to decrease, and therefore, the blend ratio of ETFE to the entire blend polymer should be at most 40 mass %.

PRIOR ART DOCUMENTS

Patent Documents

Patent Document 1: JP-A-5-78539
Patent Document 2: JP-A-10-334738
Patent Document 3: JP-A-2010-186585

DISCLOSURE OF INVENTION

Technical Problem

However, if ETFE is blended to a TFE/P copolymer, as pointed out in Patent Document 3, even if the proportion of ETFE blended to the TFE/P copolymer is low, the copolymer may undergo heat discoloration under heating in some cases. Heat discoloration lowers the degree of freedom of coloring properties of the blend copolymer and is thus unfavorable in the electric wire/harness field, etc., in which the degree of freedom of coloring properties is required. Further, such a blend copolymer is insufficient in the moldability, and if it is used as a covering material for an electric wire, defects due to molding failure such as weld lines may occur in some cases.

The present invention has been made under these circumstances and has an object to provide a fluorinated elastomer composition which is excellent in heat discoloration resistance and moldability, and a method for its production. Further, it also has an object to provide a molded product, cross-linked product and covered electric wire, using such a fluorinated elastomer composition.

Solution to Problem

The present inventors have inspected a fluorinated elastomer composition comprising a fluorinated rubber such as a TFE/P copolymer and a fluorinated copolymer such as ETFE, have paid attention to the fact that the compatibility of the fluorinated rubber and the fluorinated copolymer is inadequate, and have further proceeded with the study and have found that the compatibility of the fluorinated rubber and the fluorinated copolymer is improved by using as the fluorinated copolymer ETFE having a crystallization temperature of from 100 to 210° C., and accomplished the present invention.

The present invention has been accomplished on the basis of such a discovery, and provides a fluorinated elastomer composition, a method for its production, a molded product, a cross-linked product and a covered electric wire having the following constructions [1] to [12].

[1] A fluorinated elastomer composition comprising a fluorinated rubber (a) and a fluorinated copolymer (b), wherein
the fluorinated copolymer (b) has units (A) derived from tetrafluoroethylene and units (B) derived from ethylene in a molar ratio [(A)/(B)] of the units (A) to the units (B) of from 25/75 to 80/20,
the fluorinated copolymer (b) has a crystallization temperature of from 100 to 210° C. and a melt flow rate of from 0.1 to 1,000 g/10 min., and
the mass ratio [(a)/(b)] of the fluorinated rubber (a) to the fluorinated copolymer (b) is from 80/20 to 20/80.

[2] The fluorinated elastomer composition according to the above [1], wherein the fluorinated rubber (a) is a copolymer comprising from 35 to 70 mol % of units derived from tetrafluoroethylene, from 20 to 55 mol % of units derived from propylene, and from 0 to 40 mol % of units derived from other monomer.

[3] The fluorinated elastomer composition according to the above [1] or [2], wherein the fluorinated copolymer (b) further contains units (C) derived from $CH_2=CH(CF_2)_QF$ (wherein Q is an integer of from 2 to 10), in a molar ratio [(A)/(C)] of the units (A) to the units (C) of from 90/10 to 99.95/0.05.

[4] The fluorinated elastomer composition according to the above [3], wherein the fluorinated copolymer (b) further contains units (D) derived from other monomer, in a molar ratio [(A)/(D)] of the units (A) to the units (D) of from 70/30 to 99.9/0.1.

[5] The fluorinated elastomer composition according to the above [4], wherein the units (D) contains units derived from hexafluoropropylene.

[6] The fluorinated elastomer composition according to any one of the above [1] to [5], which further contains an ethylene copolymer (c) containing epoxy groups, in a mass ratio [(b)/(c)] of the fluorinated copolymer (b) to the ethylene copolymer (c) containing epoxy groups of from 100/0.1 to 100/10.

[7] A method for producing the fluorinated elastomer composition as defined in any one of the above [1] to [6], which comprises a step of kneading a material containing the fluorinated rubber (a) and the fluorinated copolymer (b) under a heating condition of from 100 to 240° C.
[8] The method for producing the fluorinated elastomer composition according to the above [7], wherein the kneading step is a step of kneading the mixture by an extruder for from 1 to 30 minutes.
[9] A molded product obtained by molding the fluorinated elastomer composition as defined in any one of the above [1] to [6].
[10] A cross-linked product obtained by cross-linking the fluorinated elastomer composition as defined in any one of the above [1] to [6].
[11] A covered electric wire comprising a conductor and a covering material for covering the conductor, wherein the covering material is the fluorinated elastomer composition as defined in any one of the above [1] to [6].
[12] A covered electric wire comprising a conductor and a covering material for covering the conductor, wherein the covering material is the cross-linked product as defined in the above [10].

Advantageous Effects of Invention

The fluorinated elastomer composition of the present invention is excellent in heat discoloration resistance and moldability, and the molded product, cross-linked product or covered electric wire formed by using the fluorinated elastomer composition of the present invention is excellent in heat discoloration resistance and has little defects due to molding failure such as weld lines.

DESCRIPTION OF EMBODIMENTS

Fluorinated Elastomer Composition

Figure 1:
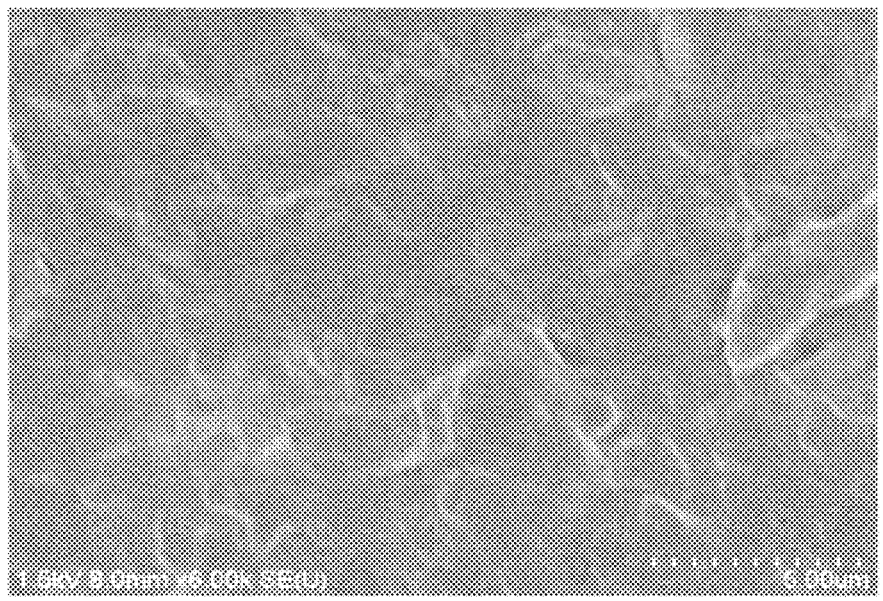
FIG. 1 is a view showing a scanning electron microscopic photograph (6,000 magnifications) of the fluorinated elastomer composition in Example 1.

The fluorinated elastomer composition of the present invention (hereinafter sometimes referred to as the composition of "the present invention") comprises a fluorinated rubber (a) and a fluorinated copolymer (b) and as the case requires, an ethylene copolymer (c) containing epoxy groups.

Here, in the following description, a molar ratio of units constituting each component is a molar ratio measured by means of $^{13}$C-NMR, FT-IR, fluorine content analysis method or the like.

"Units derived from other monomer" mean units derived from a monomer other than the monomers forming units essential as the units constituting the polymer (such as tetrafluoroethylene and propylene in the TFE/P copolymer, or ethylene and tetrafluoroethylene in ETFE).

(Fluorinated Rubber (a))

The fluorinated rubber (a) (hereinafter sometimes referred to as the "component (a)") is a copolymer containing fluorine atoms and is an elastic copolymer having no melting point (fluorinated elastomer).

The component (a) may, for example, be a tetrafluoroethylene/propylene copolymer, a vinylidene fluoride/tetrafluoroethylene/propylene copolymer, a vinylidene fluoride/hexafluoropropylene copolymer, a vinylidene fluoride/tetrafluoroethylene/hexafluoropropylene copolymer, a tetrafluoroethylene/perfluoro(alkyl vinyl ether) copolymer, a vinylidene fluoride/chlorotrifluoroethylene copolymer or a vinylidene fluoride/tetrafluoroethylene/perfluoro(alkyl vinyl ether) copolymer. As the component (a), one type may be used alone, or two or more types may be used in combination.

The component (a) is preferably at least one member selected from the group consisting of a tetrafluoroethylene/propylene copolymer, a vinylidene fluoride/tetrafluoroethylene/propylene copolymer, a vinylidene fluoride/hexafluoropropylene copolymer, a vinylidene fluoride/tetrafluoroethylene/hexafluoropropylene copolymer and a tetrafluoroethylene/perfluoro(alkyl vinyl ether) copolymer, more preferably a tetrafluoroethylene/propylene copolymer (TFE/P copolymer).

The TFE/P copolymer is an elastic copolymer comprising units derived from tetrafluoroethylene (hereinafter sometimes referred to as "TFE") and units derived from propylene (hereinafter sometimes referred to as "P").

In the TFE/P copolymer, the molar ratio [TFE/P] of the units derived from TFE to the units derived from P is typically from 25/75 to 90/10, preferably 40/60 to 70/30.

The TFE/P copolymer may further contains units derived from other monomer.

The TFE/P copolymer is preferably a copolymer comprising from 35 to 70 mol % of units derived from TFE, from 25 to 55 mol % of units derived from P, and from 0 to 40 mol % of units derived from other monomer. Here, from 0 to 40 mol % of units derived from other monomer means that no unis derived from other monomer are contained, or if contained, their proportion is from 0.01 to 40 mol %.

The proportion of units derived from TFE in all units constituting the TFE/P copolymer is more preferably from 40 to 70 mol %, further preferably from 50 to 65 mol %, particularly preferably from 52 to 60 mol %. When the proportion of units derived from TFE is at least 35 mol %, the composition of the present invention is excellent in mechanical properties, chemical resistance, flexibility, etc. Further, when the proportion of units derived from TFE is at most 70 mol %, the component (a) may have units derived from P in a sufficient proportion.

The proportion of units derived from P in all units constituting the TFE/P copolymer is more preferably from 25 to 55 mol %, further preferably from 30 to 55 mol %, particularly preferably from 35 to 50 mol %, most preferably from 40 to 48 mol %. When the proportion of units derived from P is at least 20 mol %, the composition of the present invention is excellent in moldability and flexibility. Further, when the proportion of units derived from P is at most 55 mol %, it may have units derived from TFE in a sufficient proportion.

The proportion of units derived from other monomer in all units constituting the TFE/P copolymer is more preferably from 0 to 20 mol %, further preferably from 0 to 15 mol %, particularly preferably from 0 to 10 mol %. Here, from 0 to 20 mol % of units derived from other monomer means, as described above, that no units derived from other monomer are contained, or if contained, their proportion is from 0.01 to 20 mol %. The same applies hereinafter.

In a case where units derived from other monomer are contained, the lower limit value for their proportion is preferably 0.1 mol %, more preferably 0.5 mol %. When the proportion of units derived from other monomer is at most 40 mol %, the composition of the present invention may have units derived from TFE and P in sufficient proportions.

Other monomer may, for example, be a fluorinated monomer other than TFE, a hydrocarbon monomer other than P, a cross-linkable monomer, etc.

The fluorinated monomer other than TFE may, for example, be chlorotrifluoroethylene, vinylidene fluoride, hexafluoropropylene, a perfluoro(alkyl vinyl ether), a perfluoro(alkyloxyalkyl vinyl ether), etc. As the fluorinated monomer, one type may be used alone, or two or more types may be used in combination.

When the component (a) contains units derived from a fluorinated monomer other than TFE, it is possible to improve e.g. the low temperature flexibility of the composition of the present invention.

The number of carbon atoms in the perfluoroalkyl group in the perfluoro(alkyl vinyl ether) is preferably from 1 to 6, more preferably from 1 to 4. As a specific example of the perfluoroalkyl group, a $CF_3$ group, a $C_2F_5$ group or a $C_3F_7$ group is preferred.

The number of carbon atoms in the perfluoro(alkyloxyalkyl) group in the perfluoro(alkyloxyalkyl vinyl ether) is preferably from 2 to 8, more preferably from 2 to 6.

The number of etheric oxygen atoms in the perfluoro(alkyloxyalkyl) group is preferably at most 4, more preferably at most 2. As a specific example of the perfluoro(alkyloxyalkyl) group, a $CF_3OCF(CF_3)CF_2$— group, a $C_2F_5OC_2F_4$— group, a $C_3F_7OC_3F_6$— group or a $C_3F_7OC_3F_6OC_3F_6$— group is preferred.

Specific examples of the perfluoro(alkyl vinyl ether) and the perfluoro(alkyloxyalkyl vinyl ether) include $CF_2$=$CFOCF_3$, $CF_2$=$CFOCF_2CF_3$, $CF_2$=$CFOCF_2CF_2CF_3$, $CF_2$=$CFO(CF_2)_3CF_3$, $CF_2$=$CFO(CF_2)_4CF_3$, $CF_2$=$CFOCF_2OCF_3$, $CF_2$=$CFOCF_2CF_2OCF_3$, $CF_2$=$CFOCF_2CF_2OCF_2CF_3$, $CF_2$=$CFO(CF_2)_3OCF_2CF_3$, $CF_2$=$CFOCF_2CF(CF_3)OCF_3$, $CF_2$=$CFOCF_2CF(CF_3)O(CF_2)_2CF_3$, $CF_2$=$CFO(CF_2CF_2O)_2CF_2CF_3$, $CF_2$=$CFO[CF_2CF(CF_3)O]_2CF_3$, $CF_2$=$CFO[CF_2CF(CF_3)O]_2(CF_2)_2CF_3$, etc.

The hydrocarbon monomer other than P may, for example, be a vinyl ether such as methyl vinyl ether, ethyl vinyl ether, butyl vinyl ether, tert-butyl vinyl ether, methoxyethyl vinyl ether or ethoxyethyl vinyl ether; a vinyl ester such as vinyl acetate, vinyl benzoate or vinyl nonanoate; or an α-olefin (excluding P) such as ethylene, butene or isobutene. As the hydrocarbon monomer, one type may be used alone, or two or more types may be used in combination.

When the component (a) contains units derived from a hydrocarbon monomer other than P, it is possible to improve e.g. the molding processability of the composition of the present invention.

In a case where as other monomer, a fluorinated monomer, a hydrocarbon monomer or their mixture is employed, the content of units derived from other monomer in the number of moles of the total of units derived from TFE and P is preferably from 0.01 to 20 mol %, more preferably from 0.1 to 15 mol %, particularly preferably from 0.3 to 10 mol %.

The cross-linkable monomer is meant for a monomer having at least one cross-linkable group in the same molecule. The cross-linkable group in the cross-linkable monomer may, for example, be a carbon-carbon double bond, a halogen atom or the like.

The cross-linkable monomer includes, for example, 1-bromo-1,1,2,2-tetrafluoroethyl trifluorovinyl ether, 1-iodo-1,1,2,2-tetrafluoroethyl trifluorovinyl ether, vinyl crotonate, vinyl methacrylate, etc. As the cross-linkable monomer, one type may be used alone, or two or more types may be used in combination.

The content of units derived from a cross-linkable monomer is preferably from 0.001 to 8 mol %, more preferably from 0.001 to 5 mol %, particularly preferably from 0.01 to 3 mol %, in all units constituting the TFE/P copolymer.

By incorporating the units derived from a cross-linkable monomer, it is possible to improve e.g. the mechanical properties or compression set of the composition of the present invention.

The Mooney viscosity ($ML_{1+10}$, 121° C.) of the component (a) is preferably from 20 to 200, more preferably from 30 to 150, most preferably from 40 to 120. The Mooney viscosity is an index for the molecular weight and is measured in accordance with JIS K6300-1:2000. The larger the value, the larger the molecular weight, and the smaller the value, the smaller the molecular weight. When the Mooney viscosity is within a range of from 20 to 200, the composition of the present invention is excellent in mechanical properties and moldability.

As an example of a commercial product of the component (a), "AFLAS150CS" manufactured by Asahi Glass Company, Limited, may be mentioned.

(Fluorinated Copolymer (b))

The fluorinated copolymer (b) (hereinafter sometimes referred to as the "component (b)") has units (A) derived from TFE and units (B) derived from ethylene (hereinafter sometimes referred to as "E").

Of the component (b), the molar ratio [(A)/(B)] of the units (A) to the units (B) is from 25/75 to 80/20, preferably from 50/50 to 62/38, more preferably from 51/49 to 61/39, most preferably from 53/47 to 60/40. As compared with a case where (A)/(B) is 25/75, if the proportion of the units (B) is less than 25 mol % based on 100 mol % of the total of the units (A) and the units (B), mechanical strength expected in the electric wire/harness application tends to be insufficient, and if the proportion is higher than 50 mol %, the heat resistance expected in the electric wire/harness application tends to be insufficient. That is, within such a range, excellent mechanical strength and excellent heat resistance are achieved.

The component (b) preferably further contains units (C) derived from $CH_2$=$CH(CF_2)_QF$ (wherein Q is an integer of from 2 to 10) in addition to the units (A) and (B). When the component (b) contains the units (C), stress crack resistance may be improved, or favorable productivity of a fluororesin may be maintained.

In $CH_2$=$CH(CF_2)_QF$, Q is preferably an integer of from 2 to 6.

In a case where the component (b) contains the units (C), the molar ratio [(A)/(C)] of the units (A) to the units (C) is preferably from 85/15 to 99.9/0.1, more preferably from 86/14 to 99.8/0.2, further preferably from 88/12 to 99.7/0.3, most preferably from 90/10 to 99.5/0.5. When the proportion of the units (C) is at least the preferred lower limit value, properties such as stress crack resistance and processability of the composition of the present invention will improve. Further, the crystallization temperature of the component (b) may be lowered.

The component (b) may further contain units (D) derived from a monomer other than TFE, E and $CH_2=CH(CF_2)_QF$. When the component (b) contains the units (D), the crystallization temperature of the component (b) is lowered.

Such other monomer may be a fluorinated monomer or a non-fluorinated monomer.

The fluorinated monomer as other monomer may, for example, be a fluorinated olefin (excluding TFE and $CH_2=CH(CF_2)_QF$) such as vinyl fluoride, vinylidene fluoride (hereinafter sometimes referred to as "VDF"), trifluoroethylene or hexafluoropropylene (hereinafter sometimes referred to as "HFP") or chlorotrifluoroethylene, a fluoro (alkyl vinyl ether) such as $CF_2=CFOR^1$ (wherein $R^1$ is a $C_{1-10}$ fluoroalkyl group which may contain an etheric oxygen atom), $CF_2=CFOR^2SO_2X^1$ (wherein $R^2$ is a $C_{1-10}$ fluoroalkylene group which may contain an etheric oxygen atom, and $X^1$ is a halogen atom or a hydroxy group), $CF_2=CFOR^3CO_2X^2$ (wherein $R^3$ is a $C_{1-10}$ fluoroalkylene group which may contain an etheric oxygen atom, and $X^2$ is a hydrogen atom or an alkyl group having at most 3 carbon atoms), $CF_2=CF(CF_2)_POCF=CF_2$ (wherein P is 1 or 2), $CH_2=CX^3(CF_2)_QX^4$ (wherein $X^3$ is a hydrogen atom or a fluorine atom, Q is an integer of from 2 to 10, and $X^4$ is a hydrogen atom or a fluorine atom) or perfluoro(2-methylene-4-methyl-1,3-dioxolane). As the fluorinated monomer, one type may be used alone, or two or more types may be used in combination.

$R^1$ is preferably a $C_{1-10}$ fluoroalkyl group.

The number of carbon atoms in $R^1$ is preferably from 1 to 6, more preferably from 1 to 4. The fluoroalkyl group is particularly preferably a perfluoroalkyl group such as a $CF_3$ group, a $C_2F_5$ group or a $C_3F_7$ group.

Each of $R^2$ to $R^3$ is a $C_{1-10}$ fluoroalkylene group.

The number of carbon atoms in $R^2$ and $R^3$ is preferably from 1 to 6, more preferably from 1 to 4. The fluoroalkylene group is particularly preferably a perfluoroalkylene group such as a $CF_2$ group, a $C_2F_4$ group, a $C_3F_6$ group or a $C_4F_8$ group.

The fluorinated monomer is preferably VDF, HFP, $CF_2=CFOR^1$, $CH_2=CX^3(CF_2)_QX^4$ or the like, more preferably HFP, $CF_2=CFOR^1$, $CH_2=CX^3(CF_2)_QX^4$ or the like.

Specific examples of $CF_2=CFOR^1$ include $CF_2=CFOCF_2CF_3$, $CF_2=CFOCF_2CF_2CF_3$, $CF_2=CFOCF_2CF_2CF_2CF_3$ and $CF_2=CFO(CF_2F$, and $CF_2=CFOCF_2CF_2CF_3$ is preferred.

Specific examples of $CH_2=CX^3(CF_2)_QX^4$ include $CH_2=CH(CF_2)_2F$, $CH_2=CH(CF_2)_3F$, $CH_2=CH(CF_2)_4F$, $CH_2=CF(CF_2)_3H$ and $CH_2=CF(CF_2)_4H$, and $CH_2=CH(CF_2F, CH_2=CH(CF_2)_2F$ or the like is preferred.

The non-fluorinated monomer as other monomer may, for example, be a vinyl ether such as methyl vinyl ether, ethyl vinyl ether, butyl vinyl ether, tert-butyl vinyl ether, methoxyethyl vinyl ether or ethoxyethyl vinyl ether; an α-olefin (excluding E) such as P, butene or isobutene; or a carbonyl group-containing monomer.

The carbonyl group-containing monomer may, for example, be a vinyl ester such as vinyl acetate, vinyl benzoate or vinyl nonanoate; an unsaturated dicarboxylic acid such as itaconic acid, 5-norbornene-2,3-dicarboxylic acid, citraconic acid or maleic acid; or an unsaturated acid anhydride such as itaconic anhydride (hereinafter sometimes referred to as "IAH"), 5-norbornene-2,3-dicarboxylic acid anhydride, citraconic anhydride or maleic anhydride.

As the non-fluorinated monomer, one type may be used alone, or two or more types may be used in combination.

The component (b) preferably contains, as the units (D), units derived from HFP, whereby the crystallization temperature may be lowered without decreasing heat resistance.

In a case where the component (b) contains units derived from HFP, the component (b) may contain as the units (D) only units derived from HFP, or may further contain units other than the units derived from HFP.

In a case where the component (b) contains the units (D), the molar ratio [(A)/(D)] of the units (A) to the units (D) is from 70/30 to 99.9/0.1, preferably from 75/25 to 98/2, more preferably from 80/20 to 95/5, further preferably from 82/18 to 90/10. When the preferred proportion of the units (D) is at least the lower limit value, the crystallization temperature of the component (b) will be sufficiently low, and more excellent effects of the present invention will be obtained.

The component (b) is preferably at least one member (hereinafter sometimes referred to as a component (b1)) selected from the group consisting of an E/TFE copolymer, an E/TFE/HFP copolymer, an E/P/TFE copolymer, an E/P/TFE/$CH_2=CH(CF_2)_QF$ copolymer and an E/TFE/HFP/$CH_2=CH(CF_2)_QF$ copolymer.

Among the components (b1), in a fluorinated copolymer containing units derived from HFP, the molar ratio of the units derived from a monomer other than HFP/the units derived from HFP is preferably from 90/10 to 94/6, more preferably from 91/9 to 93/7. If the molar ratio of the units derived from the monomer other than HFP is lower than 90, polymerization hardly occurs and in addition, the heat resistance will decrease, and if the molar ratio is higher than 94, the melting point tends to be high and moldability will deteriorate. When the molar ratio is within such a range, excellent processability (polymerizability) and heat resistance will be achieved, and excellent moldability will also be achieved.

Among the components (b1), in a fluorinated copolymer containing units derived from P, the molar ratio of the units derived from a monomer other than P/the units derived from P is preferably from 80/20 to 94/6, more preferably from 85/15 to 93/7. If the molar ratio of the units derived from a monomer other than P is lower than 80, heat resistance will be low, and if the molar ratio is higher than 94, the melting point tends to be high, and the moldability tends to be deteriorated. Within such a range, excellent productivity (polymerizability) and heat resistance will be achieved, and excellent moldability will also be achieved.

The component (b1) may further contain units derived from a monomer containing a carbonyl group.

The monomer containing a carbonyl group is preferably at least one member selected from the group consisting of itaconic acid, itaconic anhydride, 5-norbornene-2,3-dicarboxylic acid, 5-norbornene-2,3-dicarboxylic anhydride, citraconic acid, citraconic anhydride, maleic acid and maleic anhydride.

The molar ratio of the units derived from a monomer other than the monomer containing a carbonyl group/the units derived from the monomer containing a carbonyl group is preferably from 90/10 to 99.99/0.01, more preferably from 92/8 to 99.95/0.05, further preferably from 95/5 to 99.92/0.08, most preferably from 96/4 to 99.9/0.1. When the proportion of the units derived from the monomer containing a carbonyl group is at most 10 mol % based on all the units, the obtainable composition will be excellent in mechanical properties.

The crystallization temperature of the component (b) is from 100 to 210° C., preferably from 120 to 205° C., more preferably from 150 to 200° C. When the crystallization temperature of the component (b) is at most 210° C., the molding temperature may be lowered since the compatibility between the components (a) and (b) improves, and the obtainable composition will be excellent in heat discoloration resistance and moldability. When the crystallization temperature of the component (b) is at least 100° C., heat discoloration resistance will improve.

The crystallization temperature of the component (b) may be adjusted by the content of units (units (C), (D), etc.) other than the units (A) and (B) in the component (b). For example, the higher the content of other units is, the lower the crystallization temperature of the component (b) tends to be.

The crystallization temperature of the component (b) is measured by the method as disclosed in the after-mentioned Examples.

The melt flow rate (hereinafter sometimes referred to as "MFR") of the component (b) is from 0.1 to 1,000 g/10 min., preferably from 0.1 to 500 g/10 min., more preferably from 0.1 to 200 g/10 min., most preferably from 0.2 to 100 g/10 min. MFR is an index for the molecular weight. When the MFR is at least the lower limit value of the above range, molding processability, equal to a fluorinated resin, by hot-melting of the composition becomes feasible from the viewpoint of equipment. When the MFR is at most the upper limit value of the above range, the molded product will have a strength sufficient for practical use.

Here, MFR in the present invention is a value measured at a temperature higher by from 20 to 50° C. than the crystallization temperature of an object to be measured (e.g. the fluorinated copolymer or the fluorinated elastomer composition) under a load of 49 N. Specifically, it is a mass (g/10 min.) of a resin flowing out in 10 minutes from a nozzle having a diameter of 2 mm and a length of 8 mm under a load of 49 N at a preset temperature, as measured by a Koka-type flow tester.

The preset temperature when the MFR is measured varies depending upon the crystallization temperature of the object to be measured, however, the MFR of the component (b) used in Examples of the present invention is a value measured at a temperature of 220° C. under a load of 49 N, and the MFR of each of the compositions in Examples, the components (b) (comparative products) used in Comparative Examples and compositions in Comparative Examples is a value measured at a temperature of 297° C. under a load of 49 N.

(Ethylene Copolymer (c) Containing Epoxy Groups)

The composition of the present invention preferably further contains an ethylene copolymer (c) containing epoxy groups (hereinafter sometimes referred to as the "component (c)"). By the composition containing the component (c), more excellent effects of the present invention will be obtained. The component (c) is considered to have an effect to improve the compatibility between the component (a) and the component (b).

The component (c) may be an ethylene copolymer such as a copolymer comprising units derived from E and units derived from a monomer having an epoxy group, or a copolymer comprising units derived from E, units derived from a monomer having an epoxy group and units derived from other monomer. As the component (c), one type may be used alone, or two or more types may be used in combination.

The monomer having an epoxy group may, for example, be an unsaturated glycidyl ether (such as allyl glycidyl ether, 2-methylallyl glycidyl ether or vinyl glycidyl ether), or an unsaturated glycidyl ester (such as glycidyl acrylate or glycidyl methacrylate). Among them, glycidyl methacrylate is preferred, since it is thereby possible to obtain a component (c) which further improves the compatibility between the component (a) and the component (b). As the monomer having an epoxy group, one type may be used alone, or two or more types may be used in combination.

Other monomer may, for example, be an acrylic acid ester (such as methyl acrylate or ethyl acrylate), a methacrylic acid ester (such as methyl methacrylate or ethyl methacrylate), a fatty acid vinyl ester such as vinyl acetate, an α-olefin other than E, etc. Among them, an ethylene unsaturated ester, i.e. an acrylic acid ester, a methacrylic acid ester or a fatty acid vinyl ester is preferred. When such a monomer is used as other monomer, it is possible to obtain a component (c) which further improves the compatibility between the component (a) and the component (b). As such other monomer, one type may be used alone, or two or more types may be used in combination.

The component (c) is preferably a copolymer having units derived from E and units derived from glycidyl methacrylate. When such a copolymer is used, a cross-linked product of the obtainable fluorinated elastomer composition will be further excellent in properties such as flexibility, oil resistance, moldability, etc. As a specific example of such a copolymer, an ethylene/glycidyl methacrylate copolymer may be mentioned.

Further, a copolymer comprising units derived from E, units derived from glycidyl methacrylate and units derived from an ethylene unsaturated ester, is also preferred from the viewpoint of moldability and mechanical properties. As a specific example of such a copolymer, an ethylene/glycidyl methacrylate/vinyl acetate copolymer, an ethylene/methyl acrylate/glycidyl methacrylate copolymer or an ethylene/ethyl acrylate/glycidyl methacrylate copolymer may be mentioned. Among them, an ethylene/methyl acrylate/glycidyl methacrylate copolymer, an ethylene/ethyl acrylate/glycidyl methacrylate copolymer or the like is preferred.

The content of units derived from E in all units constituting the component (c) is preferably from 55 to 99.9 mol %, more preferably from 70 to 94 mol %. When the content of units derived from E is at least 55 mol %, the composition will be excellent in heat resistance and toughness.

The content of units derived from the monomer containing an epoxy group in all units constituting the component (c) is preferably from 0.1 to 15 mol %, more preferably from 1 to 10 mol %. When the content of units derived from the monomer containing an epoxy group is at least 0.1 mol %, the composition will be excellent in moldability and mechanical properties.

In a case where the component (c) has units derived from other monomer, the content of units derived from such other monomer in all units constituting the component (c) is preferably from 1 to 30 mol %, more preferably from 10 to 30 mol %.

When the component (c) is used wherein the contents of the respective units are within the above ranges, it is possible to further improve the compatibility between the component (a) and the component (b). As a result, a cross-linked product of the obtainable fluorinated elastomer composition will be further excellent in properties such as flexibility, oil resistance, heat discoloration resistance, moldability, etc.

As a commercial product of the component (c), "Bond Fast E (trade name, manufactured by Sumitomo Chemical Co., Ltd.)" which is an ethylene/glycidyl methacrylate copolymer or "Bond Fast 7M (trade name, manufactured by Sumitomo Chemical Co., Ltd.)" which is an ethylene/methyl acrylate/glycidyl methacrylate copolymer, may, for example, be mentioned.

(Blend Ratios)

In the composition of the present invention, the mass ratio [(a)/(b)] of the component (a) to the component (b) is from 80/20 to 20/80, preferably from 75/25 to 25/75, more preferably from 70/30 to 28/72, further preferably from 65/35 to 30/70, most preferably from 60/40 to 40/60.

When the blend ratio of the component (a) is at least the lower limit value of the above range, excellent flexibility and moldability is obtainable. On the other hand, when the blend ratio of the component (b) is at least the lower limit value of the above range, excellent oil resistance and heat discoloration resistance are obtainable.

In a case where the composition of the present invention contains the component (c), in the composition of the present invention, the mass ratio [(b)/(c)] of the component (b) to the component (c) is from 100/0.1 to 100/10, preferably from 100/0.3 to 100/7, more preferably from 100/0.5 to 100/5.

When the blend ratio of the component (c) is at least the lower limit value of the above range, a cross-linked product of the fluorinated elastomer composition is less likely to have a problem of heat discoloration. This is considered to be such that the compatibility between the component (a) and the component (b) tends to thereby improve.

If the blend ratio of the component (c) exceeds the upper limit value of the above range, the proportion of the component (a) and the component (b) is relatively decreased, and the oil resistance tends to be low, and at the same time, the heat resistance may be inadequate.

When the entire composition of the present invention is taken as 100 mass %, the total content of the components (a) to (c) i.e. [((a)+(b)+(c))/fluorinated elastomer composition] is preferably at least 30 mass %, more preferably at least 50 mass %, particularly preferably from 30 to 90 mass %.

The composition of the present invention may contain a component other than the components (a) to (c) (hereinafter sometimes referred to as other optional component).

Such other optional component may, for example, be a cross-linking agent, a cross-linking aid, a filler, a stabilizer, a colorant, an antioxidant, a processing aid, a sliding agent, a lubricant, a flame retardant, an antistatic agent, etc., and at least one of them may be incorporated as the case requires.

In a case where the composition of the present invention is to be cross-linked, among these additives, a cross-linking agent or a cross-linking aid is preferably incorporated.

As the cross-linking agent, any conventional one may be used, but an organic peroxide is preferred. As such an organic peroxide, one which is capable of easily generating radicals under heating or in the presence of a redox agent, may be used. The fluorinated elastomer composition cross-linked by using an organic peroxide is excellent in heat resistance.

Specific examples of the organic peroxide include 1,1-di (t-hexylperoxy)-3,5,5-trimethylcyclohexane, 2,5-dimethyl-hexane-2,5-dihydroperoxide, di-t-butyl peroxide, t-butyl-cumyl peroxide, dicumyl peroxide, α,α'-bis(t-butylperoxy)-p-diisopropylbenzene, 2,5-dimethyl-2,5-di(t-butylperoxy)-hexane, 2,5-dimethyl-2,5-di(t-butylperoxy)-hexyne-3, dibenzoyl peroxide, t-butyl peroxybenzene, 2,5-dimethyl-2,5-di(benzoylperoxy)hexane, t-butylperoxymaleic acid, t-hexylperoxyisopropyl monocarbonate, etc. Among them, α,α'-bis(t-butylperoxy)-p-diisopropylbenzene is preferred. These organic peroxides are excellent in cross-linking performance of the fluorinated elastomer composition.

The content of the organic peroxide is preferably from 0.1 to 5 parts by mass, more preferably from 0.2 to 4 parts by mass, most preferably from 0.5 to 3 parts by mass, per 100 parts by mass of the total content of the components (a) to (c) in the composition of the present invention. When the content is within such a range, the cross-linking efficiency of the organic peroxide is high.

As the cross-linking aid, triallyl cyanurate, triallyl iso-cyanurate, triacryl formal, triallyl trimellitate, dipropargyl terephthalate, diallyl phthalate, tetraallyl terephthalamide, triallyl phosphate, etc. may be mentioned. Among them, triallyl isocyanurate is preferred. As the cross-linking aid, at least one type may be used.

In a case where the composition of the present invention contains a cross-linking aid, the content of the cross-linking aid is preferably from 0.1 to 30 parts by mass, more preferably from 0.5 to 15 parts by mass, further preferably from 1 to 10 parts by mass, per 100 parts by mass of the component (a). When the content of the cross-linking aid is at least the lower limit value of the above range, the cross-linking rate is high, and a sufficient cross-linking degree is readily obtainable. When it is at most the above upper limit value, the properties such as elongation, etc., of a cross-linked product obtained by cross-linking of the composition of the present invention will be good.

As the filler, carbon black, white carbon, clay, talc, calcium carbonate, glass fibers, carbon fibers, a fluororesin (such as polytetrafluoroethylene), etc. may be mentioned.

As the carbon black, one commonly used as a filler for fluororubber may be employed without any particular restriction. As the specific examples, furnace black, acetylene black, thermal black, channel black, graphite, etc. may be mentioned, and furnace black is preferred. As the furnace black, HAF-LS, HAF, HAF-HS, FEF, GPF, APF, SRF-LM, SRF-HM, MT, etc. may be mentioned and among them, MT carbon is more preferred. As the filler, at least one type may be used.

In a case where the composition of the present invention contains carbon black, the content of carbon black is preferably from 1 to 50 parts by mass, more preferably from 3 to 20 parts by mass, per 100 parts by mass of the component (a). When the content of carbon black is at least the lower limit value of the above range, a cross-linked product of the composition of the present invention will be excellent in strength, and it is possible to sufficiently obtain a reinforcing effect by blending carbon black. Further, when it is at most the upper limit value of the above range, the elongation of the cross-lined product will also be excellent. Thus, when the content of carbon black is within the above range, the balance of the strength and elongation of the cross-linked product will be good.

In a case where the composition of the present invention contains a filler other than carbon black, the content of such a filler is preferably from 5 to 200 parts by mass, more preferably from 10 to 100 parts by mass, per 100 parts by mass of the component (a).

Further, as the filler, carbon black and a filler other than carbon black may be used in combination.

In a case where the composition of the present invention contains carbon black and a filler other than carbon black, their total content is preferably from 1 to 100 parts by mass, more preferably from 3 to 50 parts by mass, per 100 parts by mass of the content of the component (a).

As the stabilizer, copper iodide, copper oxide, lead oxide, calcium oxide, magnesium oxide, aluminum oxide, titanium oxide, antimony oxide or phosphorus pentoxide etc. may be mentioned.

As the processing aid, a higher fatty acid or a metal salt of a higher fatty acid etc. may be mentioned. Specifically, stearic acid, a stearic acid salt or a lauric acid salt is preferred. The content of the processing aid is preferably from 0.1 to 10 parts by mass, more preferably from 0.2 to 5 parts by mass, further preferably from 1 to 3 parts by mass, per 100 parts by mass of the component (a). As the processing aid, at least one type may be used.

As the sliding agent, a higher fatty acid or a metal salt of a higher fatty acid etc. may be mentioned, and is preferably stearic acid, a stearic acid salt or a lauric acid salt. The content of the sliding agent is preferably from 0.1 to 20 parts by mass, more preferably from 0.2 to 10 parts by mass, further preferably from 1 to 5 parts by mass, per 100 parts by mass of the total content of the components (a) to (c) in the fluorinated elastomer composition.

As the metal of the metal salt of the higher fatty acid, either in the case of the processing aid or the sliding agent, preferable are calcium, sodium, zinc, barium and aluminum, particularly preferable are calcium and sodium.

(Properties of Fluorinated Elastomer Composition)

The melt flow rate (MFR) of the composition of the present invention is preferably from 1 to 100 g/10 min., more from 4 to 50 g/10 min., further preferably from 5 to 40 g/10 min., most preferably from 6 to 35 g/10 min. When MFR is within such a range, the moldability and mechanical properties will be excellent.

The flexural modulus of the composition of the present invention is preferably from 10 to 800 MPa, more preferably from 10 to 600 MPa, further preferably from 50 to 400 MPa, most preferably from 70 to 300 MPa. The flexural modulus is a value which is an index for flexibility. The larger the flexural modulus, the lower the flexibility, and the smaller the flexural modulus, the higher the flexibility.

(Method for Producing Fluorinated Elastomer Composition)

The composition of the present invention is produced by kneading the components (a) and (b).

In a case where the composition of the present invention contains the component (c), the component (c) is kneaded together with the components (a) and (b). In a case where the composition of the present invention contains other optional components, said other optional components may be added together with the components (a) and (b) and as the case requires the component (c) in a step of kneading them, or may be added after the components (a) and (b) and as the case requires the component (c) are kneaded.

Kneading of the components may be carried out by means of a known instrument having a kneading mechanism, such as an internal mixer, a single screw kneader, a twin-screw kneader, a single screw extruder, a twin-screw extruder or a multi-screw extruder. Among them, it is preferred to carry out kneading by means of an extruder such as a twin-screw extruder or a multi-screw extruder.

The kneading of the components is preferably melt-kneading which is carried out under heating at a temperature of from 100 to 240° C. The heating temperature is more preferably from 120 to 240° C., further preferably from 140 to 240° C. When the kneading temperature is within such a range, the ratio in melt-viscosity of the component (a) and the component (b) becomes close to 1, a fluorinated elastomer composition excellent in dispersibility is obtainable, and the molded product obtainable therefrom will be excellent in surface smoothness. The heating temperature as represented by the relation with the crystallization temperature, is preferably the crystallization temperature +20° C. to 80° C., more preferably +25° C. to 75° C., further preferably +30° C. to 70° C.

By melt-kneading, the components (a) and (b) are melted and compatibilized, and become in a uniformly dispersed state. Practically, the uniformly dispersed sate was confirmed by the small particle size of the dispersed phase by observation of the morphology with a scanning electron microscope. The uniformity of the dispersed state is particularly remarkable when the component (c) is contained. Further, compatibilization of the components (c) and (b) was confirmed by a change of the glass transition point by observation of the peak temperature of tan δ in the dynamic viscoelasticity measurement of the component (b).

As the apparatus to be used for melt-kneading, a twin-screw extruder, or a single screw extruder equipped with a screw having a high kneading efficiency, is preferred, a twin-screw extruder is more preferred, and a twin-screw extruder equipped with screws having a high kneading efficiency is most preferred. As a screw having a high kneading efficiency, it is more preferred to select one which has an adequate kneading efficiency for the composition and which presents no excessive shearing force.

The shear speed is preferably set depending upon the melt-viscosity of the composition within the above-mentioned temperature range.

The rotational speed of the screw of the extruder in the melt-kneading is preferably from 50 to 1,000 rpm, more preferably from 100 to 500 rpm. If the screw rotational speed is too low, the dispersibility of the composition obtainable by shearing may sometimes be low, and if it is too high, the molecular chains of the copolymers are likely to be cut, whereby elongation of the obtainable composition tends to be low. When the screw rotational speed is within such a range, the compatibilizing reaction properly proceeds, and the balance of the strength and elongation will be good.

The progress of compatibilization may be controlled by adjusting parameters such as the kneading time, kneading temperature, shearing speed, etc. Especially in a case where the component (c) is blended, by adjusting the shearing speed condition to minimize the difference in melt-viscosity between the component (b) and the component (c), the dispersed particles of the component (b) will be further reduced in their size.

The melt-kneading is conducted until the viscosity of the composition becomes constant. The change in viscosity during the melt-kneading of the composition may be inspected by a change with time of the rotational torque by a torque meter via the screw. Here, "until the viscosity of the composition becomes constant" means that the melt-kneading is conducted until such a state that the change in the rotational torque value is within 5% from the center value for at least a predetermined time.

The time required for the melt-kneading may vary depending upon the temperature for the melt-kneading, the blend composition of the composition or the shape of the screw, but, from the viewpoint of the economical efficiency and productivity, it is preferably from 1 to 30 minutes, more preferably from 1 to 20 minutes, most preferably from 2 to 10 minutes.

For example, in a case where the component (a) having a melt viscosity of 2.3 kPa·s and the component (b) having a melt viscosity of 2.4 kPa·s are to be melt-kneaded in a mass ratio of 50/50 at 270° C., in the case of using a capillary rheometer (manufactured by Toyo Seiki Seisaku-sho, Ltd.), the time for melt-kneading is preferably from 2 to 7 minutes. Further, in the case of using a twin screw extruder, a retention time of from 1 to 5 minutes is preferred. The retention time may be set by preliminarily measuring the change with time of the viscosity by means of a batch-type twin screw kneader such as Laboplasto Mill (manufactured by Toyo Seiki Seisaku-sho, Ltd.) and based on such data of the change with time.

The form of the component (b) to be used for the melt-kneading is preferably a powder. As such a powder, one with a small particle size is more preferred. When the particle size is small, kneading becomes easy at the time of conducting the melt-kneading, and besides, a uniform melt-kneaded state is readily obtainable. Particularly, as such a powder, a powder obtained by drying an ETFE slurry obtained by solution polymerization is preferred.

Further, the form of the component (a) is preferably crumbs. It is particularly preferred to use crumbs of a TFE/P copolymer obtained by coagulating a latex of the TFE/P copolymer obtained by emulsion polymerization, by drying the crumbs.

It is also preferred that before the melt-kneading, the crumbs of the TFE/P copolymer and the powder of ETFE are mixed without heating, by means of a conventional apparatus. Further, it is also preferred to mix the two copolymers in the extruder at the time of melt-kneading.

(Function and Effects)

The fluorinated elastomer composition of the present invention is excellent in heat discoloration resistance and moldability.

Further, the fluorinated elastomer composition of the present invention is excellent also in flexibility and oil resistance to lubricant oil such as automatic transmission oil. For an elastomer material to be used in electric wire/harness application particularly for a harness of an engine room of an automobile, excellent flexibility to secure the degree of freedom of wiring of the harness is required. The fluorinated elastomer composition of the present invention can have both sufficient flexibility in the electric wire/harness application and oil resistance to lubricant oil.

The above effect is considered to be because of an increased compatibility between the components (a) and (b), by using as ETFE the component (b) having a crystallization temperature of from 100 to 210° C.

That is, ETFE which has been widely used for the electric wire/harness application has a crystallization temperature at a level of higher than 210° C. and at most 250° C., and by such ETFE and the component (a), a problem of dispersion failure is likely to arise. This is considered to be because they are incompatible, and when only such two components are kneaded, even if they are kneaded under heating (melt-kneading), dispersion may be locally insufficient.

In the present invention, compatibility between the components (a) and (b) is good, and dispersion failure is less likely to occur when these components are kneaded. Particularly in a case where the mass ratio of the component (a) to the component (b) is from 55/45 to 45/55, the two copolymers may sometimes form a continuous phase. It is considered that when such a morphology is fixed, the flexibility and heat resistance of the fluorinated elastomer composition can be maintained. It is considered that by such fixing of the morphology, dispersion failure may be prevented, and it is possible to obtain a molded product excellent in mechanical properties such as elongation, etc.

Further, by further incorporating the component (c), physical properties of the fluorinated elastomer composition will be further excellent. This is considered to be because the compatibility is increased by the component (c).

<Molded Product and Cross-Linked Product>

The molded product of the present invention is a molded product obtained by molding the fluorinated elastomer composition of the present invention. The molding method may, for example, be injection molding, extrusion molding, coextrusion molding, blow molding, compression molding, inflation molding, transfer molding or calendar molding.

The fluorinated elastomer composition of the present invention is excellent in molding processability, as the withdrawing speed may be set to be high.

The cross-linked product of the present invention is one obtained by cross-linking the fluorinated elastomer composition of the present invention. The cross-linking is carried out at the same time as molding, or after molding.

The flexural modulus of the cross-linked product of the present invention is preferably from 10 to 600 MPa, more preferably from 50 to 400 MPa, most preferably from 70 to 300 MPa.

The molded product or the cross-linked product of the present invention may, for example, be made to be an electrical insulating material such as a covering material for e.g. electrical components. As specific applications, in addition to a coating material in the after-described covered electric wire, a sheath material for protecting an electric wire, an insulating covering material and sheath material for cables, etc. may be mentioned.

Further, the cross-linked product may be made to be a cylindrical product such as a hose, tube, etc. Such a cylindrical product may be produced by extrusion-molding the fluorinated elastomer composition into a cylindrical shape, followed by cross-linking.

The cross-linked product of the present invention may also be made to be various components to be used in various industrial fields such as the automobile field, the industrial robot field, the heating equipment field, such as gaskets, packing, diaphragms, etc.

The cross-linking method for obtaining the cross-linked product is not particularly limited. For example, it may be a chemical cross-linking method using as a cross-linking agent an organic peroxide such as $\alpha,\alpha'$-bis(t-butylperoxy)-p-diisopropylbenzene or dicumyl peroxide, or an irradiation cross-linking method using an ionizing radiation such as X-rays, $\gamma$-rays, electron beams, proton beams, heavy proton beams, $\alpha$-rays or $\beta$-rays.

In an application to a covering material for an electric component such as an electric wire, an electron beam cross-linking using electron beams as the ionizing radiation, is preferred, and in an application to a cylindrical product such as a hose, tube, etc., a chemical cross-linking method using an organic peroxide, is preferred.

<Covered Electric Wire>

The covered electric wire of the present invention is one comprising a conductor and a covering material for covering the conductor, wherein the covering material is the fluorinated elastomer composition or the cross linked product of the present invention.

The conductor is not particularly limited and may, for example, be copper, a copper alloy, aluminum, an aluminum alloy, various plated wires such as tin-plated, silver-plated and nickel-plated wires, a stranded wire, a super conductive conductor, a plated wire for semiconductor element lead, etc.

The covered electric wire wherein the covering material is the fluorinated elastomer composition of the present invention may be produced by covering a conductor with the fluorinated elastomer composition of the present invention. Covering of the conductor with the fluorinated elastomer composition may be carried out by a known method.

The covered electric wire wherein the covering material is the cross-linked product of the present invention may be produced by irradiating with electron beams the covered electric wire of the present invention having a conductor covered with the fluorinated elastomer composition of the present invention to cross-link the fluorinated elastomer composition.

The irradiation dose of electron beams is preferably from 50 to 700 kGy, more preferably from 80 to 400 kGy, most preferably from 100 to 250 kGy. The temperature at the time of irradiation with electron beams is preferably from 0 to 300° C., more preferably from 10 to 200° C., most preferably from 20 to 100° C.

The fluorinated elastomer composition of the present invention has a melt viscosity lower than the component (a) as a raw material, and thus is excellent in molding processability, as the withdrawing speed may be set to be high. Accordingly, the covered electric wire of the present invention can be produced at a high speed.

Further, it contains the component (a), whereby, as compared with a covered electric wire obtained by using the thermoplastic component (b) only, it can be used continuously at a high temperature, and it is excellent also in flexibility and thus is suitable for application to e.g. a covered electric wire for automobiles, which is required for wiring to conserve space.

EXAMPLES

Now, the present invention will be described specifically with reference to Examples and Comparative Examples. However, it should be understood that the present invention is by no means thereby restricted.

In the following, MFR of the component (b) and the fluorinated elastomer composition and the crystallization temperature of the component (b) were measured by the following procedure.

Further, materials used in each Example are as follows.
<MFR>
To measure the MFR, two kinds of conditions were employed.

The MFR simply referred to as "MFR" is a mass (g) of the composition or the copolymer flowing out in unit time (10 minutes) from a nozzle having a diameter of 2 mm and a length of 8 mm under a load of 49 N at a temperature of 297° C., as measured by a melt index.

The MFR represented as "MFR (220)" is a mass (g) of the composition or the copolymer flowing out in unit time (10 minutes) from a nozzle having a diameter of 2 mm and a length of 8 mm under a load of 49 N at a temperature of 220° C., as measured by a melt index.
<Crystallization Temperature>

The crystallization temperature is a temperature corresponding to a local maximum value of crystallization peaks recorded when about 5 mg of a sample was held in a stream of dry air at 300° C. for 10 minutes and cooled to 100° C. at a cooling rate of 10° C./min., measured by a differential scanning calorimeter (DSC-7020 manufactured by SII NanoTechnology).
<Materials Used>
[Component (a)]
(150C)

"AFLAS 150C" manufactured by Asahi Glass Company, Limited, being a TFE/P bipolymer, was used.

The molar ratio (TFE/P) of units derived from TFE to units derived from P, was 56/44; a peroxide-cross-linked type; the fluorine content was 57 mass %, the Mooney viscosity $ML_{1+10}$ (121° C.) was 120; the glass transition temperature (Tg) was −3° C.; and the melting point (Tm) was nil. [Component (b)]

(b-1)
Granules of a fluorinated copolymer 1 produced as follows were used.

A polymerization tank having an internal capacity of 430 liter equipped with a stirrer was deaerated, 237.2 kg of 1-hydrotridecafluorohexane (hereinafter sometimes referred to as C6H), 49.5 kg of 1,3-dichloro-1,1,2,2,3-pentafluoropropane (manufactured by Asahi Glass Company, Limited, AK225cb, hereinafter sometimes referred to as AK225cb), 122 kg of HFP and 1.31 kg of $CH_2$=$CH(CF_2)_4F$ were charged, the interior of the polymerization tank was heated to 66° C., and the pressure was increased to 1.5 MPa/G by an initial monomer mixture gas of TFE/E in a molar ratio of 89/11. 2.5 L of a 2 mass % C6H solution of tert-butyl peroxypivalate as a polymerization initiator was charged to initiate polymerization. A monomer mixture gas of TFE/E in a molar ratio of 54/46 was continuously charged so that the pressure would be constant during polymerization. Further, $CH_2$=$CH(CF_2)_4F$ in an amount corresponding to 1 mol % and IAH in an amount corresponding to 0.4 mol % based on the total number of moles of TFE and E charged during the polymerization were continuously charged. 9.3 hours after initiation of the polymerization, at a point when 29 kg of the monomer mixture gas was charged, the internal temperature of the polymerization tank was dropped to room temperature and the pressure was purged to normal pressure. The obtained fluorinated copolymer (hereinafter referred to as a "fluorinated copolymer 1") in a slurry form was poured into a 850 L granulation tank in which 300 kg of water was charged, and granulated while the solvent was removed by distillation with heating from room temperature to 105° C. with stirring. The obtained granules were dried at 150° C. for 15 hours to obtain 33.2 kg of granules of the fluorinated copolymer 1.

From results of melt NMR analysis, fluorine content analysis and infrared absorption spectrum analysis, the fluorinated copolymer 1 was confirmed to be a copolymer comprising units derived from TFE/units derived from HFP/units derived from $CH_2$=$CH(CF_2)_4F$/units derived from IAH/units derived from E in a molar ratio of 46.2/9.4/1.0/0.4/43.0. Further, of the fluorinated copolymer 1, the crystallization temperature was 174° C., and the MFR (220) was 8 g/10 min.

(b-2)
Granules of a fluorinated copolymer 2 produced as follows were used.

A polymerization tank having an internal capacity of 430 liter equipped with a stirrer was deaerated, 390.6 kg of C6H, 121.5 kg of AK225cb, and 1.645 kg of $CH_2$=$CH(CF_2)_2F$ were charged, the interior of the polymerization tank was heated to 66° C., and the pressure was increased to 1.5 MPa/G by an initial monomer mixture gas of TFE/E in a molar ratio of 89/11. 20.5 g of tert-butyl peroxypivalate as a polymerization initiator was charged to initiate polymerization. A monomer mixture gas of TFE/E in a molar ratio of 59/41 was continuously charged so that the pressure would be constant during polymerization. Further, $CH_2$=$CH(CF_2)_4F$ in an amount corresponding to 2.15 mol % and IAH in an amount corresponding to 0.15 mol % based on the total number of moles of TFE and E charged during the polymerization were continuously charged. 4.00 hours after initiation of the polymerization, at a point when 34.5 kg of the monomer mixture gas was charged, the internal temperature of the polymerization tank was dropped to room temperature and the pressure was purged to normal pressure. The obtained fluorinated copolymer (hereinafter referred to as a "fluorinated copolymer 2") in a slurry form was poured into a 850 L granulation tank in which 300 kg of water was charged, and granulated while the solvent was removed by distillation with heating from room temperature to 105° C. with stirring (time required: 140 min.). The obtained granules were dried at 150° C. for 15 hours to obtain 35.0 kg of granules of the fluorinated copolymer 2.

From results of melt NMR analysis, fluorine content analysis and infrared absorption spectrum analysis, the fluorinated copolymer 2 was confirmed to be a copolymer comprising units derived from TFE/units derived from $CH_2=CH(CF_2)_2F$/units derived from IAH/units derived from E in a molar ratio of 56.5/3.0/0.2/40.3. Further, of the fluorinated copolymer 2, the crystallization temperature was 221° C., and the MFR was 26.1 g/10 min.

(b-3)

Granules of a fluorinated copolymer 3 produced as follows were used.

A polymerization tank having an internal capacity of 430 liter equipped with a stirrer was deaerated, 390.6 kg of C6H, 121.5 kg of AK225cb, and 1.645 kg of $CH_2=CH(CF_2)_2F$ were charged, the interior of the polymerization tank was heated to 66° C., and the pressure was increased to 1.5 MPa/G by an initial monomer mixture gas of TFE/E in a molar ratio of 89/11. 82.3 g of tert-butyl peroxypivalate as a polymerization initiator was charged to initiate polymerization. A monomer mixture gas of TFE/E in a molar ratio of 59/41 was continuously charged so that the pressure would be constant during polymerization. Further, $CH_2=CH(CF_2)_2F$ in an amount corresponding to 2.15 mol % and IAH in an amount corresponding to 0.6 mol % based on the total number of moles of TFE and E charged during the polymerization were continuously charged. 3.85 hours after initiation of the polymerization, at a point when 34.5 kg of the monomer mixture gas was charged, the internal temperature of the polymerization tank was dropped to room temperature and the pressure was purged to normal pressure. The obtained fluorinated copolymer (hereinafter referred to as a "fluorinated copolymer 3") in a slurry form was poured into a 850 L granulation tank in which 300 kg of water was charged, and granulated while the solvent was removed by distillation with heating from room temperature to 105° C. with stirring (time required: 156 min.). The obtained granules were dried at 150° C. for 15 hours to obtain 35.5 kg of granules of the fluorinated copolymer 3.

From results of melt NMR analysis, fluorine content analysis and infrared absorption spectrum analysis, the fluorinated copolymer 3 was confirmed to be a copolymer comprising units derived from TFE/units derived from $CH_2=CH(CF_2)_2F$/units derived from IAH/units derived from E in a molar ratio of 55.5/1.9/0.8/41.8. Further, of the fluorinated copolymer 3, the crystallization temperature was 222° C., and the MFR was 25.2 g/10 min.

(b-4)

"Fluon LM-730AP" manufactured by Asahi Glass Company, Limited being a TFE/$CH_2=CH(CF_2)_4F$/E terpolymer, was used.

The compositional ratio of the terpolymer was such that the molar ratio of units derived from TFE/units derived from $CH_2=CH(CF_2)_2F$/units derived from E was 57/3/40. The crystallization temperature was 212° C., and the MFR was 25 g/10 min.

[Component (c)]

(BF-7M)

"Bond Fast 7M" manufactured by Sumitomo Chemical Co., Ltd., being an ethylene/methyl acrylate/glycidyl methacrylate copolymer, was used.

The content of units derived from E was 67 mol %; the content of units derived from methyl acrylate was 27 mol %; the content of units derived from glycidyl methacrylate was 6 mol %; MFR was 7 g/10 min; Tg was −33° C., and Tm was 52° C.

Examples 1 to 6 and Comparative Examples 1 to 9

By means of an internal mixer, the above-mentioned respective materials were sufficiently kneaded (melt-kneaded) in the blend ratios (mass-based) shown in Tables 1 to 4 to obtain a fluorinated elastomer composition in each Example.

The kneading temperature was set so that a favorably kneaded state was obtained. Specifically, the kneading temperature and time were 240° C.×10 minutes in Examples 1 to 6 and 270° C.×10 minutes in Comparative Examples 1 to 16, and the rotor rotational speed was 150 rpm in all the Examples.

Then, the obtained fluorinated elastomer composition was press-molded under conditions of 250° C.×15 minutes and 10 MPa to obtain a sheet-shape sample having a thickness of about 1 mm. Then, each sheet was subjected to electron beam cross-linking with an irradiation dose of 120 kGy to obtain a cross-linked sample in each Example.

[Observation of Fluorinated Elastomer Composition]

The fluorinated elastomer compositions in Examples 1 and 5 and Comparative Examples 2 and 6 were observed by a scanning electron microscope (6,000 magnifications). The results are shown in FIGS. 1 to 4.

Figure 2:
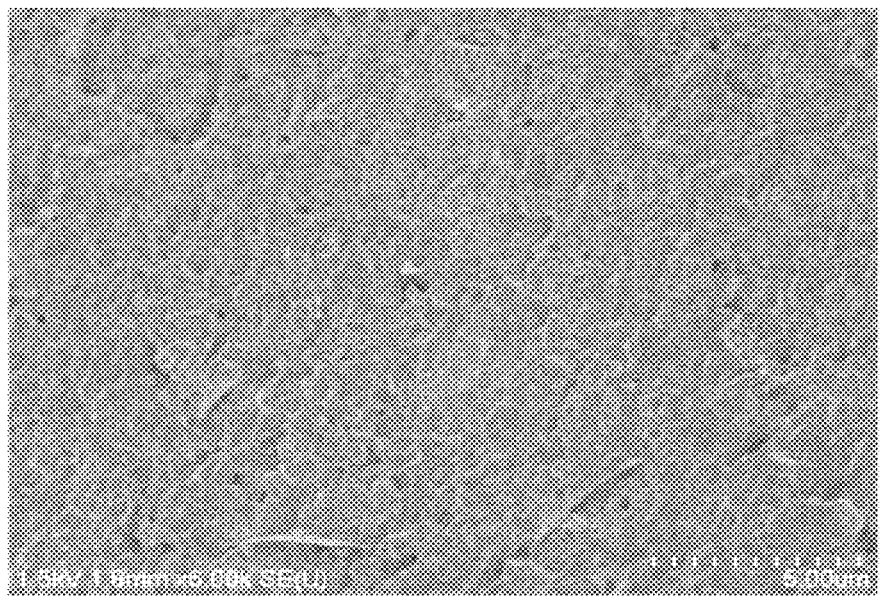
FIG. 2 is a view showing a scanning electron microscopic photograph (6,000 magnifications) of the fluorinated elastomer composition in Example 5.
Figure 3:
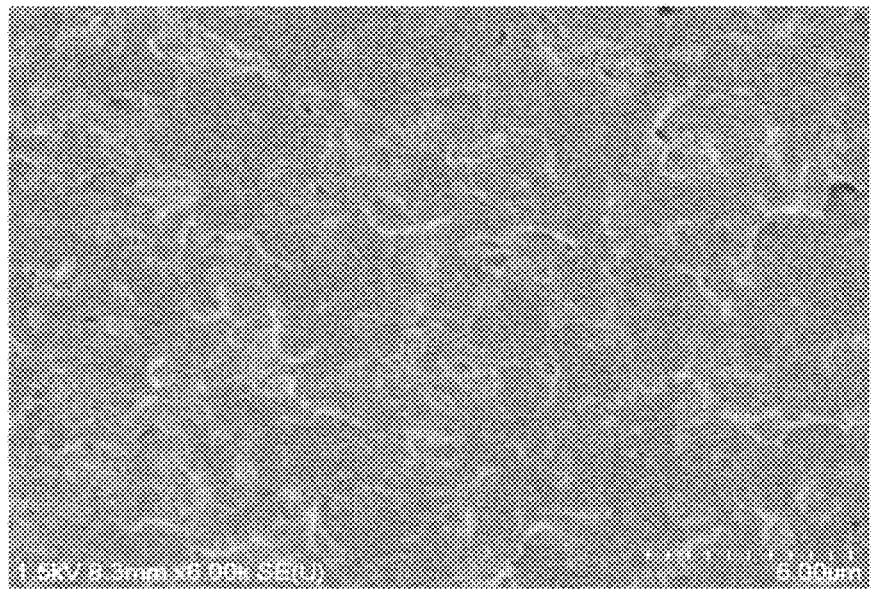
FIG. 3 is a view showing a scanning electron microscopic photograph (6,000 magnifications) of the fluorinated elastomer composition in Comparative Example 2.
Figure 4:
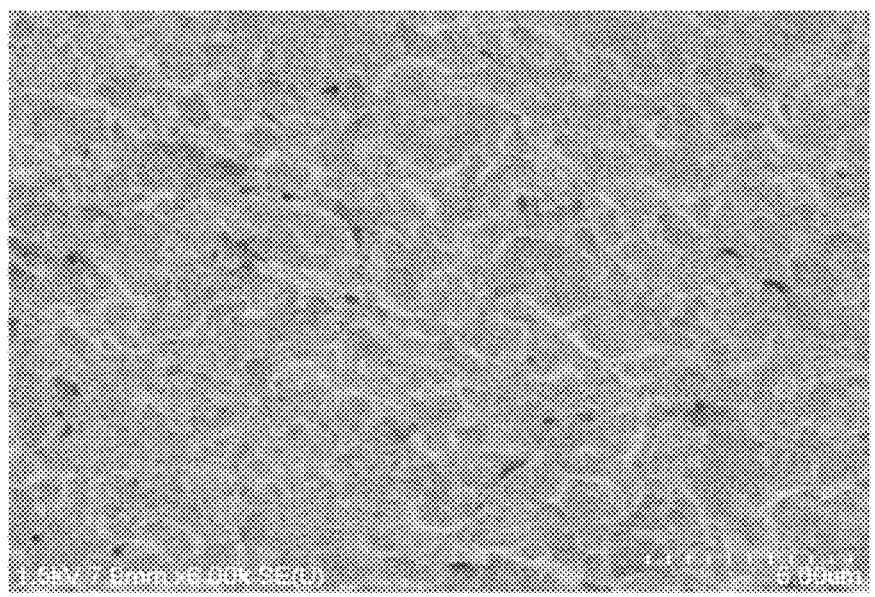
FIG. 4 is a view showing a scanning electron microscopic photograph (6,000 magnifications) of the fluorinated elastomer composition in Comparative Example 6.

As shown in FIGS. 1 and 2, it was observed that in Examples 1 and 5, the component (a) and the component (b) formed a continuous phase without being separated, and the component (b) was well dispersed in the component (a) in the form of fine dispersed phases.

Whereas, in Comparative Example 2 in which the blend ratios were the same as in Example 1 except that the type of the component (b) was different, the surface was roughened as compared with Example 1. Further, in Comparative Example 6 in which the blend ratios were the same as in Example 5 except that the type of the component (b) was different, the surface was roughened as compared with Example 5, and the compatibility state was poor.

[Evaluation of Heat Discoloration Resistance of Fluorinated Elastomer Composition]

As the index for the heat discoloration resistance, the total luminous transmittance and the color coordinate b* of the fluorinated elastomer composition were measured. The results are shown in Tables 1 to 4.

The total luminous transmittance was obtained in accordance with JIS K7375:2008. A higher total luminous transmittance indicates less discoloration by heat at the time of kneading.

As the color coordinate b*, the value of b* of CIE1976 obtained in accordance with JIS Z8729:2004 was employed for comparison. A positive b* indicates that the fluorinated elastomer composition tends to be yellowish, a negative b* indicates that the composition is bluish, and b* being 0 indicates that the composition is colorless. A smaller color coordinate b* indicates less discoloration by heat at the time of kneading. The color coordinate b* is preferably less than 5 considering the degree of freedom of coloring property.

[Evaluation of Cross-Linked Sample]

With respect to the cross-linked sample in each Example, normal state physical properties (initial tensile strength and initial tensile elongation), heat ageing resistance (retention of tensile strength and retention of tensile elongation) were evaluated in accordance with ASTM D638-V and JIS K6257:2010. Further, the ATF resistance (volume change when exposed to automatic transmission oil at 165° C. for 120 hours) of the cross-linked sample in each Example was evaluated in accordance with JIS K6258:2003 except for the exposure time. The results are shown in Tables 1 to 4.

Here, retention of tensile strength for heat ageing resistance is the proportion of the tensile strength after being left at 250° C. for 96 hours, to the initial tensile strength, and the retention of tensile elongation for heat ageing resistance is the proportion of the tensile elongation after being left at 250° C. for 96 hours, to the initial tensile elongation.

TABLE 1

|  |  |  | Examples | | | | | |
| --- | --- | --- | --- | --- | --- | --- | --- | --- |
|  |  |  | 1 | 2 | 3 | 4 | 5 | 6 |
| Blend ratios | Component (a) | 150C | 49 | 46 | 40 | 30 | 50 | 60 |
|  | Component (b) | b-1 | 50 | 50 | 60 | 70 | 50 | 40 |
|  | Component (c) | BF-7M | 1 | 4 | 0.1 | 0 | 0 | 0 |
|  | Total luminous transmittance (%) | | 62.9 | 50.5 | 67.5 | 71.5 | 58.3 | 59.9 |
|  | Color coordinate b* | | 0.0 | −1.3 | 0.0 | 0.0 | 4.4 | 4.3 |
|  | MFR (g/10 min) | | 11.0 | 6.3 | 17.8 | 26.1 | 10.7 | 6.1 |
| Normal state physical properties | Tensile strength (MPa) | | 41 | 37 | 41 | 31 | 31 | 31 |
|  | Tensile elongation (%) | | 372 | 340 | 355 | 364 | 351 | 351 |
| Heat ageing resistance | Retention of tensile strength (%) | | 83 | 93 | 71 | 103 | 97 | 92 |
|  | Retention of tensile elongation (%) | | 112 | 109 | 110 | 104 | 115 | 114 |
| ATF resistance | Volume change (%) | | 1.3 | 5.0 | 0.0 | 0.2 | 0.3 | 2.4 |

TABLE 2

|  |  |  | Comparative Example 1 |
| --- | --- | --- | --- |
| Blend ratios | Component (a) | 150C | 49 |
|  | Component (b) | b-4 | 50 |
|  | Component (c) | BF-7M | 1 |
|  | Total luminous transmittance (%) | | 43.8 |
|  | Color coordinate b* | | 10.8 |
|  | MFR (g/10 min) | | 6.9 |
| Normal state physical properties | Tensile strength (MPa) | | 35 |
|  | Tensile elongation (%) | | 359 |
| Heat ageing resistance | Retention of tensile strength (%) | | 84 |
|  | Retention of tensile elongation (%) | | 93 |
| ATF resistance | Volume change (%) | | 1.7 |

TABLE 3

|  |  |  | Comparative Examples | | | | | |
| --- | --- | --- | --- | --- | --- | --- | --- | --- |
|  |  |  | 2 | 3 | 4 | 5 | 6 | 7 |
| Blend ratios | Component (a) | 150C | 49 | 46 | 40 | 30 | 50 | 60 |
|  | Component (b) | b-2 | 50 | 50 | 60 | 70 | 50 | 40 |
|  | Component (c) | BF-7M | 1 | 4 | 0.1 | 0 | 0 | 0 |
|  | Total luminous transmittance (%) | | 44.7 | 34.8 | 54.8 | 50.6 | 39.0 | 41.5 |
|  | Color coordinate b* | | 9.7 | 8.9 | 5.6 | 3.8 | 5.6 | 5.4 |
|  | MFR (g/10 min) | | 6.3 | 5.1 | 8.0 | 10.1 | 5.7 | 4.1 |
| Normal state physical properties | Tensile strength (MPa) | | 42 | 40 | 36 | 36 | 45 | 41 |
|  | Tensile elongation (%) | | 372 | 346 | 337 | 351 | 351 | 359 |
| Heat ageing resistance | Retention of tensile strength (%) | | 71 | 80 | 96 | 86 | 79 | 69 |
|  | Retention of tensile elongation (%) | | 100 | 101 | 113 | 107 | 116 | 105 |
| ATF resistance | Volume change (%) | | 1.7 | 2.2 | 0.1 | 0.0 | 0.5 | 1.6 |

TABLE 4

|  |  |  | Comparative Example | |
| --- | --- | --- | --- | --- |
|  |  |  | 8 | 9 |
| Blend ratios | Component (a) | 150C | 49 | 50 |
|  | Component (b) | b-3 | 50 | 50 |
|  | Component (c) | BF-7M | 1 | 0 |
|  | Total luminous transmittance (%) | | 53.1 | 37.2 |
|  | Color coordinate b* | | 9.2 | 5.9 |
|  | MFR (g/10 min) | | 5.2 | 4.6 |

TABLE 4-continued

|  |  |  | Comparative Example | |
| --- | --- | --- | --- | --- |
|  |  |  | 8 | 9 |
| Normal state physical properties | Tensile strength (MPa) | | 41 | 33 |
|  | Tensile elongation (%) | | 346 | 353 |
| Heat ageing resistance | Retention of tensile strength (%) | | 76 | 72 |
|  | Retention of tensile elongation (%) | | 117 | 85 |
| ATF resistance | Volume change (%) | | 1.1 | 0.2 |

As shown in the above results, each of the fluorinated elastomer compositions in Examples 1 to 6 had a high total luminous transmittance and a color coordinate b* of less than 5, and was less susceptible to heat discoloration.

Further, each of the fluorinated elastomer compositions in Examples 1 to 6 had MFR within a range of from 6 to 35 g/10 min., and was excellent in processability.

Further, each of the cross-linked samples in Examples 1 to 6 had appropriate normal state physical properties with an initial tensile strength of from 31 to 41 MPa and an initial tensile elongation of from 340 to 372%, and was excellent in flexibility.

Further, the decrease in the tensile strength and the tensile elongation in evaluation of the heat ageing resistance was suppressed, and each sample was excellent in the heat resistance.

Further, each of the cross-linked samples in Examples 1 to 6 had a volume change of at most 5% and was excellent in ATF resistance.

Whereas the fluorinated elastomer compositions in Comparative Examples 1, 2 and 8 had a low total luminous transmittance and a large color coordinate b* and were susceptible to heat discoloration as compared with Example 1 in which the blend ratios were the same except for the type of the component (b) (hereinafter sometimes referred to as the corresponding blend ratios).

Likewise, the fluorinated elastomer compositions in Comparative Examples 6 and 9 had a low total luminous transmittance and a large color coordinate b* and were susceptible to heat discoloration as compared with Example 5 with the corresponding blend ratios.

Further, the fluorinated elastomer compositions in Comparative Examples 3, 4, 5 and 7 had a low total luminous transmittance and a large color coordinate b* and were susceptible to heat discoloration as compared with Examples 2, 3, 4 and 6 with the corresponding blend ratios, respectively.

From the above results, the fluorinated elastomer composition of the present invention was confirmed to have sufficient moldability, flexibility, heat resistance and oil resistance to lubricant oil, to be less susceptible to heat discoloration and to be very excellent.

INDUSTRIAL APPLICABILITY

The fluorinated elastomer composition of the present invention is excellent in heat discoloration resistance and moldability. Further, the molded product, cross-linked product or covered electric wire of the present invention is excellent in heat discoloration resistance, has little defects due to molding failure such as weld-lines, and has favorable flexibility and oil resistance to lubricant oil such as automatic transmission oil.

Accordingly, the fluorinated elastomer composition of the present invention has a high degree of freedom of coloring, and is suitable for use as an insulation covering material or sheath material in the fields of automobiles, industrial robots, thermal components, etc. in which several tens types of electric wires or cables are used. Further, by utilizing its excellent characteristics, it is useful also for hoses, gaskets, packing, diaphragms, tubes, etc. in the fields of automobile components, industrial robots, industrial products, etc.

This application is a continuation of PCT Application No. PCT/JP2014/075140, filed on Sep. 22, 2014, which is based upon and claims the benefit of priority from Japanese Patent Application No. 2013-198250 filed on Sep. 25, 2013. The contents of those applications are incorporated herein by reference in their entireties.

What is claimed is:

1. A fluorinated elastomer composition comprising a fluorinated rubber (a) and a fluorinated copolymer (b), wherein
the fluorinated copolymer (b) has units (A) derived from tetrafluoroethylene and units (B) derived from ethylene in a molar ratio [(A)/(B)] of the units (A) to the units (B) of from 25/75 to 80/20,
the fluorinated copolymer (b) has a crystallization temperature of from 100 to 210° C. and a melt flow rate of from 0.1 to 1,000 g/10 min., and
the mass ratio [(a)/(b)] of the fluorinated rubber (a) to the fluorinated copolymer (b) is from 80/20 to 20/80.

2. The fluorinated elastomer composition according to claim 1, wherein the fluorinated rubber (a) is a copolymer comprising from 35 to 70 mol % of units derived from tetrafluoroethylene, from 20 to 55 mol % of units derived from propylene, and from 0 to 40 mol % of units derived from other monomer.

3. The fluorinated elastomer composition according to claim 1, wherein the fluorinated copolymer (b) further contains units (C) derived from $CH_2=CH(CF_2)_QF$ (wherein Q is an integer of from 2 to 10), in a molar ratio [(A)/(C)] of the units (A) to the units (C) of from 85/15 to 99.9/0.1.

4. The fluorinated elastomer composition according to claim 3, wherein the fluorinated copolymer (b) further contains units (D) derived from other monomer, in a molar ratio [(A)/(D)] of the units (A) to the units (D) of from 70/30 to 99.9/0.1.

5. The fluorinated elastomer composition according to claim 4, wherein the units (D) contains units derived from hexafluoropropylene.

6. The fluorinated elastomer composition according to claim 1, which further contains an ethylene copolymer (c) containing epoxy groups, in a mass ratio [(b)/(c)] of the fluorinated copolymer (b) to the ethylene copolymer (c) containing epoxy groups of from 100/0.1 to 100/10.

7. A method for producing the fluorinated elastomer composition as defined in claim 1, which comprises a step of kneading a material containing the fluorinated rubber (a) and the fluorinated copolymer (b) under a heating condition of from 100 to 240° C.

8. The method for producing the fluorinated elastomer composition according to claim 7, wherein the kneading step is a step of kneading the mixture by an extruder for from 1 to 30 minutes.

9. A molded product obtained by molding the fluorinated elastomer composition as defined in claim 1.

10. A cross-linked product obtained by cross-linking the fluorinated elastomer composition as defined in claim 1.

11. A covered electric wire comprising a conductor and a covering material for covering the conductor, wherein the covering material is the fluorinated elastomer composition as defined in claim 1.

12. A covered electric wire comprising a conductor and a covering material for covering the conductor, wherein the covering material is the cross-linked product as defined in claim 10.

* * * * *